(12) United States Patent
Kobayashi et al.

(10) Patent No.: US 10,484,637 B2
(45) Date of Patent: Nov. 19, 2019

(54) IMAGE SENSOR AND IMAGE CAPTURE APPARATUS

(71) Applicant: CANON KABUSHIKI KAISHA, Tokyo (JP)

(72) Inventors: Hirokazu Kobayashi, Tokyo (JP); Nobuhiro Takeda, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/376,046

(22) Filed: Apr. 5, 2019

(65) Prior Publication Data

US 2019/0238781 A1    Aug. 1, 2019

Related U.S. Application Data

(63) Continuation of application No. 15/923,109, filed on Mar. 16, 2018, now Pat. No. 10,291,869.

(30) Foreign Application Priority Data

Mar. 22, 2017    (JP) ................................ 2017-056462

(51) Int. Cl.
*H04N 5/3745* (2011.01)
*H04N 5/225* (2006.01)
*H04N 5/378* (2011.01)

(52) U.S. Cl.
CPC ......... *H04N 5/37457* (2013.01); *H04N 5/225* (2013.01); *H04N 5/378* (2013.01)

(58) Field of Classification Search
CPC ..... H04N 5/37457; H04N 5/225; H04N 5/378
See application file for complete search history.

(56) References Cited

U.S. PATENT DOCUMENTS

| | | | |
|---|---|---|---|
| 2010/0033362 A1* | 2/2010 | Kitami | H04N 9/04511 341/169 |
| 2011/0181764 A1* | 7/2011 | Sambonsugi | H04N 5/347 348/301 |
| 2012/0235021 A1* | 9/2012 | Kasai | H04N 5/35527 250/208.1 |

(Continued)

FOREIGN PATENT DOCUMENTS

| | | |
|---|---|---|
| JP | 2001-223566 A | 8/2001 |
| JP | 2010-098548 A | 4/2010 |

*Primary Examiner* — Nhan T Tran
(74) *Attorney, Agent, or Firm* — Cowan, Liebowitz & Latman, P.C.

(57) ABSTRACT

In a pixel section of an image sensor, pixels are arranged two-dimensionally, each of the pixels including an amplifier transistor that is connected to a power voltage and has a gate into which a voltage of a signal charge generated by a photoelectric conversion area is input and a selection transistor that is connected to the amplifier transistor and a signal line. The image sensor includes an AD conversion circuit having a reference transistor having a gate into which a ramp signal is input and a constant current source that is connected to the reference transistor and the signal line. The voltage of the ramp signal or a driving ability of the reference transistor changes depending on whether one selection transistor or a plurality of selection transistors is/are turned on per signal line to obtain a signal charge to be AD-converted.

14 Claims, 8 Drawing Sheets

(56) References Cited

U.S. PATENT DOCUMENTS

| | | | |
|---|---|---|---|
| 2012/0305752 A1* | 12/2012 | Shimizu | H04N 5/3577 250/208.1 |
| 2013/0221469 A1* | 8/2013 | Kim | H01L 27/14618 257/433 |
| 2014/0078360 A1* | 3/2014 | Park | H04N 5/355 348/294 |
| 2016/0006969 A1* | 1/2016 | Matsumoto | H04N 5/357 348/308 |
| 2016/0255293 A1* | 9/2016 | Gesset | H04N 5/357 348/308 |

* cited by examiner

IMAGE SENSOR AND IMAGE CAPTURE APPARATUS

CROSS-REFERENCE TO RELATED APPLICATIONS

This application is a continuation of application Ser. No. 15/923,109, filed Mar. 16, 2018 the entire disclosure of which is hereby incorporated by reference.

BACKGROUND OF THE INVENTION

Field of the Invention

The present invention relates to an image sensor and an image capture apparatus.

Description of the Related Art

An image sensor of an image capture apparatus has a higher resolution (number of pixels) than the resolution of a display unit of the image capture apparatus, and thus a technique is known in which the number of pixels read out from the image sensor for a display image is reduced while increasing the readout framerate. A technique is also known in which image quality degradation caused by a reduction in the number of pixels is suppressed by approximately averaging the signals from adjacent pixels rather than simply thinning and reading out the pixels (Japanese Patent Laid-Open No. 2010-98548).

Additionally, Japanese Patent Laid-Open No. 2001-223566 discloses an image sensor including a comparator having pixels, a current path formation block, a current path, and a comparing unit. The current path formation block includes MOS transistors, the gates of which take charge-voltage conversion units of the respective pixels as inputs. The current path includes an operational amplifier that forms a differential pair with a MOS transistor, the gate of which is supplied with a reference voltage, and can obtain a digital signal corresponding to a pixel signal on the basis of the output of the comparing unit.

According to Japanese Patent Laid-Open No. 2010-98548, when transfer transistors connected to different amplifier transistors turn on simultaneously, the output signals of the different amplifier transistors are output to a single vertical signal line, and a plurality of pixel signals are averaged. Assume, for example, that a digital signal corresponding to the voltage in the vertical signal line has been obtained using the configuration according to Japanese Patent Laid-Open No. 2001-223566. In this case, depending on whether the signal of only one pixel is output to the vertical signal line or the signals of a plurality of pixels are output and averaged, the obtained digital signal will be different even if the signals of the respective pixels are the same. This is because the value of current flowing in the comparator is different in these respective situations.

SUMMARY OF THE INVENTION

The present invention has been conceived in light of these problems with conventional techniques. The present invention provides an image sensor and an image capture apparatus capable of driving at the same operation timing even when different numbers of transistors turn on per signal line.

According to an aspect of the present invention, there is provided an image sensor comprising: a pixel section in which pixels are arranged two-dimensionally, each of the pixels including (i) an amplifier transistor that is connected to a power voltage and has a gate into which a voltage of a signal charge generated by a photoelectric conversion area is input and (ii) a selection transistor that is connected to the amplifier transistor and a signal line; and an AD conversion circuit including (i) a reference transistor that has a gate into which a ramp signal having a voltage that changes at a constant rate is input and (ii) a constant current source that is connected to the reference transistor and the signal line, wherein the voltage of the ramp signal or a driving ability of the reference transistor changes between a first mode and a second mode, the first mode being a mode in which a voltage of a signal charge obtained by turning one selection transistor on per signal line is AD-converted by the AD conversion circuit, and the second mode being a mode in which a voltage of a signal charge obtained by turning a plurality of selection transistors on per signal line is AD-converted by the AD conversion circuit.

According to another aspect of the present invention, there is provided an image capture apparatus comprising: an image sensor that comprises: a pixel section in which pixels are arranged two-dimensionally, each of the pixels including (i) an amplifier transistor that is connected to a power voltage and has a gate into which a voltage of a signal charge generated by a photoelectric conversion area is input and (ii) a selection transistor that is connected to the amplifier transistor and a signal line; and an AD conversion circuit including (i) a reference transistor that has a gate into which a ramp signal having a voltage that changes at a constant rate is input and (ii) a constant current source that is connected to the reference transistor and the signal line, wherein the voltage of the ramp signal or a driving ability of the reference transistor changes between a first mode and a second mode, the first mode being a mode in which a voltage of a signal charge obtained by turning one selection transistor on per signal line is AD-converted by the AD conversion circuit, and the second mode being a mode in which a voltage of a signal charge obtained by turning a plurality of selection transistors on per signal line is AD-converted by the AD conversion circuit, a ramp signal generation circuit; a timing generation circuit that generates a control signal for the image sensor; and a control unit that controls operations of the ramp signal generation circuit and the timing generation circuit.

Further features of the invention will become apparent from the following description of exemplary embodiments with reference to the attached drawings.

DESCRIPTION OF THE EMBODIMENTS

Exemplary embodiments of the present invention will now be described in detail in accordance with the accompanying drawings. The following describes embodiments in which a solid-state image sensor according to the present invention is applied in a digital camera. However, the solid-state image sensor according to the present invention is not limited to image capture apparatuses, and can be applied in any electronic device employing a solid-state image sensor, including mobile phones (including smartphones), media players, game consoles, personal computers, dashboard cameras, and the like.

First Embodiment

Figure 1:
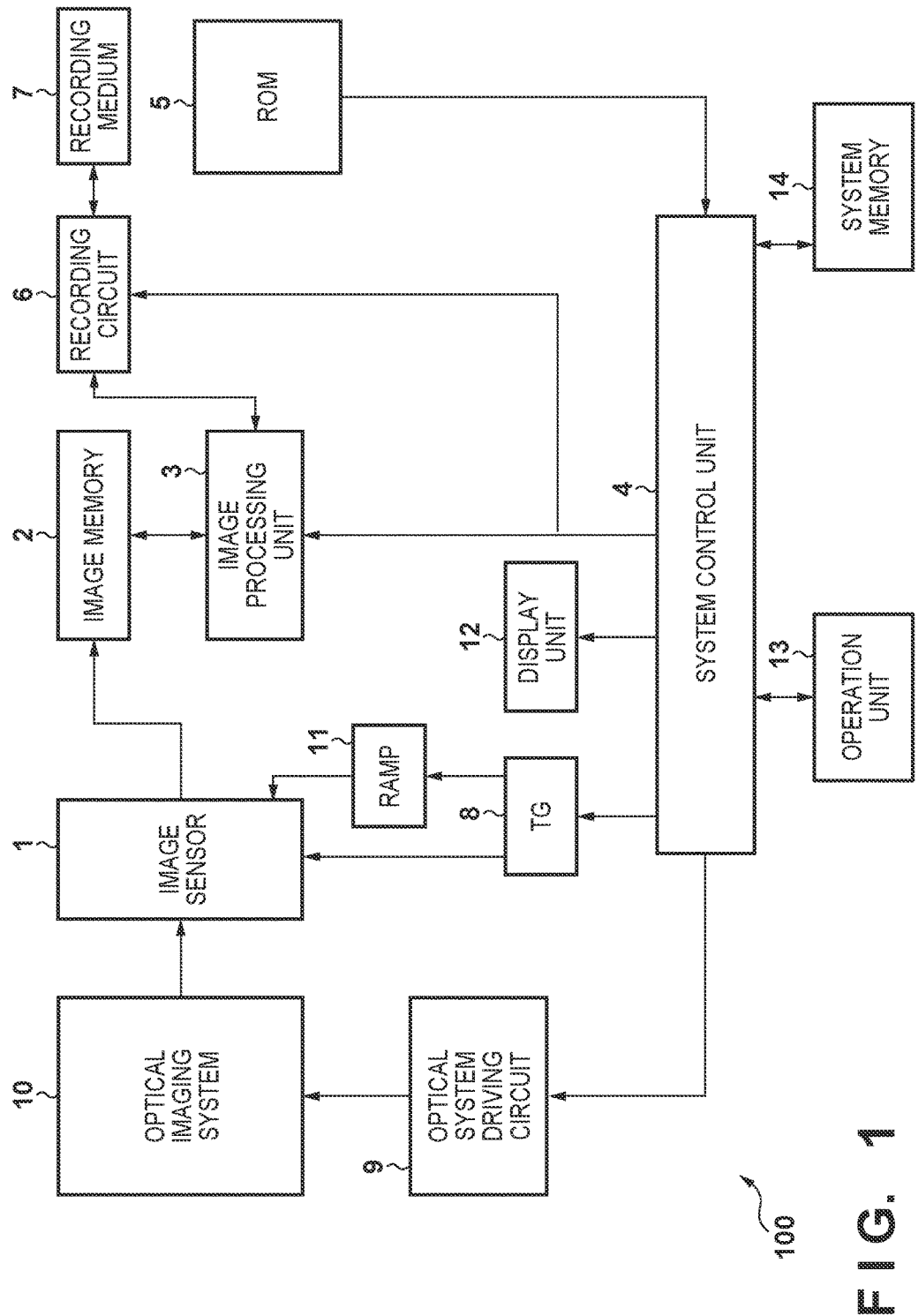
FIG. 1 is a block diagram illustrating the configuration of an image capture apparatus according embodiments.

FIG. 1 is a block diagram illustrating an example of the functional configuration of a digital camera 100 according to embodiments of the present invention. An optical imaging system 10 includes a focus lens, an aperture/shutter (called simply an "aperture" hereinafter), and so on, and forms a subject image on an image formation plane of an image sensor 1. Mobile members such as the focus lens and the aperture are driven by an optical system driving circuit 9.

The image sensor 1 is, for example, a CMOS image sensor, in which a plurality of pixels are arranged two-dimensionally. The image sensor 1 also includes a parallel- or column-type AD conversion architecture having an AD converter, for each pixel column, which AD-converts charges (voltages) accumulated in the individual pixels through photoelectric conversion and outputs one screen's worth of a digital image signal. The digital image signal is transferred to an image memory 2.

An image processing unit 3 subjects the digital image signal transferred to the image memory 2 to processing for generating image data for display or recording, such as white balance adjustment, color interpolation (demosaicing), noise reduction, sharpness adjustment, color tone correction, scaling, and encoding. The image processing unit 3 also finds a variety of evaluation values and information for use in automatic exposure control (AE), automatic focus detection (AF), and so on from the digital image signal. For example, the image processing unit 3 can find information pertaining to a brightness value of the digital image signal, contrast information of pixels within a focus detection region, information pertaining to a subject region such as a person's face, and so on, but the information is not limited thereto. The image processing unit 3 further carries out image processing, such as decoding and scaling processing, for displaying, in a display unit 12, image data recorded in a recording medium 7. The image processing unit 3 may be realized by at least one DSP, ASIC, ASSP, or the like.

A system control unit 4 includes at least one programmable processor (called a "CPU" hereinafter), and implements the functions of the digital camera 100 by, for example, loading programs stored in ROM 5 into system memory 14 and executing those programs. Note that some of the processing executed by the system control unit 4 may be realized by hardware such as an ASIC or an ASSP. At least some of the operations executed by the image processing unit 3 may be implemented by the CPU constituting the system control unit 4 executing software. The operations of the image sensor 1, which will be described later, are implemented by the system control unit 4 controlling operations of a timing generation circuit 8 on the basis of a driving pattern stored in the ROM 5.

The ROM 5 is non-volatile memory, and may be at least partially rewritable. The ROM 5 stores programs executed by the system control unit 4, various setting values, constants, display data such as a GUI, and so on.

A recording circuit 6 records image data for recording, generated by the image processing unit 3, into the recording medium 7, which is a memory card or the like, in accordance with a predetermined file system. The recording circuit 6 also reads out image data recorded in the recording medium 7 and supplies the image data to the image processing unit 3.

The timing generation (TG) circuit 8 generates timing signals that control the operations, initialization, and so on of a vertical scanning circuit and a horizontal scanning circuit included in the image sensor 1, counters, and a ramp signal generation circuit 11.

The ramp signal generation circuit (RAMP) 11 generates a ramp signal having a reference voltage that increases or decreases at a constant rate over time. The voltage change rate (slope) of the ramp signal can be changed by a signal generated by the timing generation circuit 8.

The display unit 12 is a touch display, for example, and displays information of the digital camera 100, live view images, captured or played-back images, GUIs, and so on under the control of the system control unit 4.

An operation unit 13 is a collection of input devices, such as buttons, switches, and dials, through which a user inputs instructions to the digital camera 100. If the display unit 12 is a touch display, a touch panel partially constitutes the operation unit 13. The input devices constituting the operation unit 13 may be assigned specific functions in a fixed or dynamic manner. For example, fixed functions are assigned to a shutter button, an operating mode switching dial, a moving image recording button, and so on. On the other hand, functions are assigned dynamically to a directional key (cross key), a main dial, and so on depending on the operational state of the digital camera 100, the display state of the display unit 12, and so on. Note that FIG. 1 only illustrates some of the functions of the digital camera 100.

Figure 2:
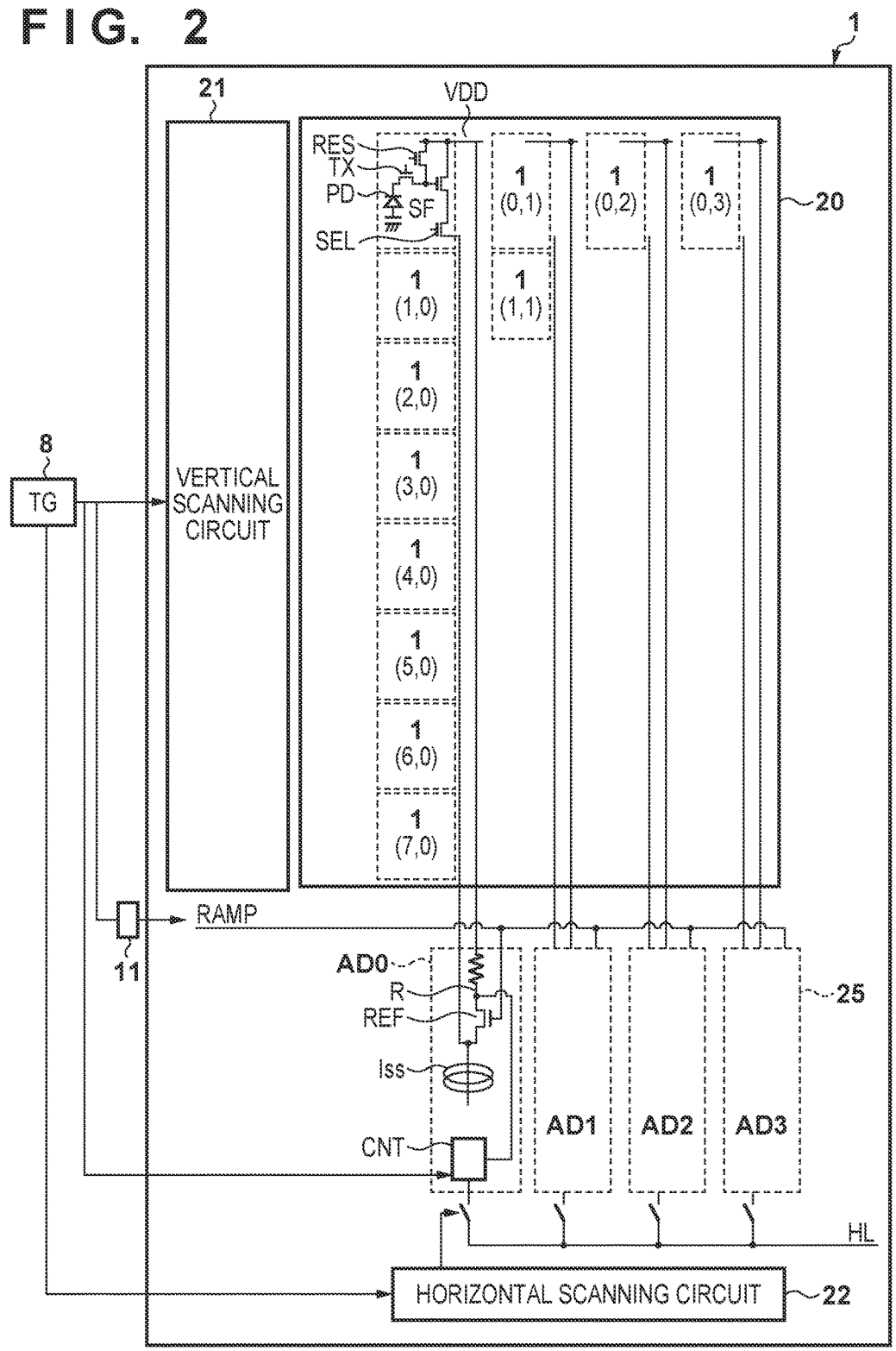
FIG. 2 is a block diagram illustrating the configuration of an image sensor according to embodiments.

FIG. 2 is a diagram illustrating an example of the configuration of the image sensor 1 and the peripheral circuitry thereof. Of a plurality of pixels arranged two-dimensionally in a pixel section 20 of the image sensor 1, a pixel located in a pth row and a qth column is indicated as a pixel 1(p,q). All of the pixels have the same configuration, but FIG. 2 only illustrates the configuration of a pixel 1(0,0). The pixel 1(0,0) includes a photodiode PD, which is a photoelectric conversion area that generates a signal charge in accordance with the intensity of light entering from the optical imaging system 10. The signal charge generated by the photodiode PD is applied to the gate of an amplifier transistor SF by a transfer transistor TX. The connection path between the transfer transistor TX and the amplifier transistor SF functions as a charge-voltage conversion unit that converts the signal charge into a voltage. A reset transistor RES resets the voltage (signal voltage) at the conversion unit with a power voltage VDD. The drain of a selection transistor SEL is connected the source of the amplifier transistor SF. FIG. 2 schematically illustrates eight rows and four columns of pixels in the pixel section 20, for a total of 32 pixels; however, several million to several tens of millions of pixels are arranged in the pixel section 20 of an image sensor used in a typical modern digital camera.

The vertical scanning circuit controls the operations of the transfer transistor TX, the reset transistor RES, and the selection transistor SEL in order to select the pixels to be read out, taking the group of pixels connected to the same signal line as a unit. The vertical scanning circuit can also carry out simulative averaging driving, which simultaneously selects a plurality of rows of pixels, in response to timing signals generated by the timing generation circuit 8 under the control of the system control unit 4.

The source of the selection transistor SEL is connected to a constant current source Iss. The ramp signal RAMP is applied to the gate of a reference transistor REF. The selection transistor SEL, the reference transistor REF, and a resistor R constitute a comparator. The reference transistor REF and the amplifier transistor SF have the same characteristics, such as threshold voltage and gain coefficient β (β∝gate width/gate length).

The resistor R and the reference transistor REF are connected to the power voltage VDD common with the pixel 1(0,0), and the source of the reference transistor REF is connected to the current source Iss. Accordingly, the amplifier transistor SF that transmits the signal voltage of the pixel 1(0,0), and the selection transistor SEL, form a current mirror circuit. Accordingly, whether the constant current supplied by the constant current source Iss flows in the amplifier transistor SF and the selection transistor SEL (a first path) or in the resistor R and REF (a second path) depends on the magnitude relationship between the signal voltage of the pixel 1(0,0) and the ramp signal RAMP.

Note that when the signal voltage of the pixel 1(0,0) is equal to the ramp signal RAMP, a current half the current supplied by the constant current source Iss (Iss/2) flows in both the first and second paths. The voltage across both ends of the resistor R at this time is R·Iss/2. If (power voltage VDD−R·Iss/2) is set as a threshold and inputted as an enable signal of a counter CNT, the time from when the ramp signal RAMP is generated to the instant when the magnitude relationship with the signal voltage of the pixel 1(0,0) inverts can be measured as the value of the counter CNT. An AD conversion circuit AD0 takes the counter value as a digital value of the charge voltage of the pixel 1(0,0). By configuring a current mirror circuit in this manner, the ramp signal RAMP can be compared with the voltage of an analog pixel signal using the reference transistor REF, without the analog pixel signal being output from the pixel 1(0,0). In particular, this is the same as the pixel signal voltages from a selected row being immediately input to the comparator upon the row being selected, which makes it possible to shorten the time required for AD conversion.

Although having a comparatively simple circuit configuration, the AD conversion circuit AD0 is capable of setting the signal voltage of pixels and executing AD conversion operations partially in parallel, and can therefore accelerate readout. Although the readout of the signal voltage from the pixel 1(0,0) has been described here, the operations for reading out a pixel 1(p,0) are the same as the operations for reading out the pixel 1(0,0). An AD conversion circuit having the same configuration as the AD conversion circuit AD0 is provided for each pixel column, and the AD conversion circuit provided in the qth pixel column is denoted as ADq.

The horizontal scanning circuit selects the count values (digital pixel signals) of the AD conversion circuit ADq sequentially in the horizontal direction, transfers the values to a horizontal signal line HL, and outputs one pixel row's worth of a digital image signal.

First Driving Mode

Figure 3:
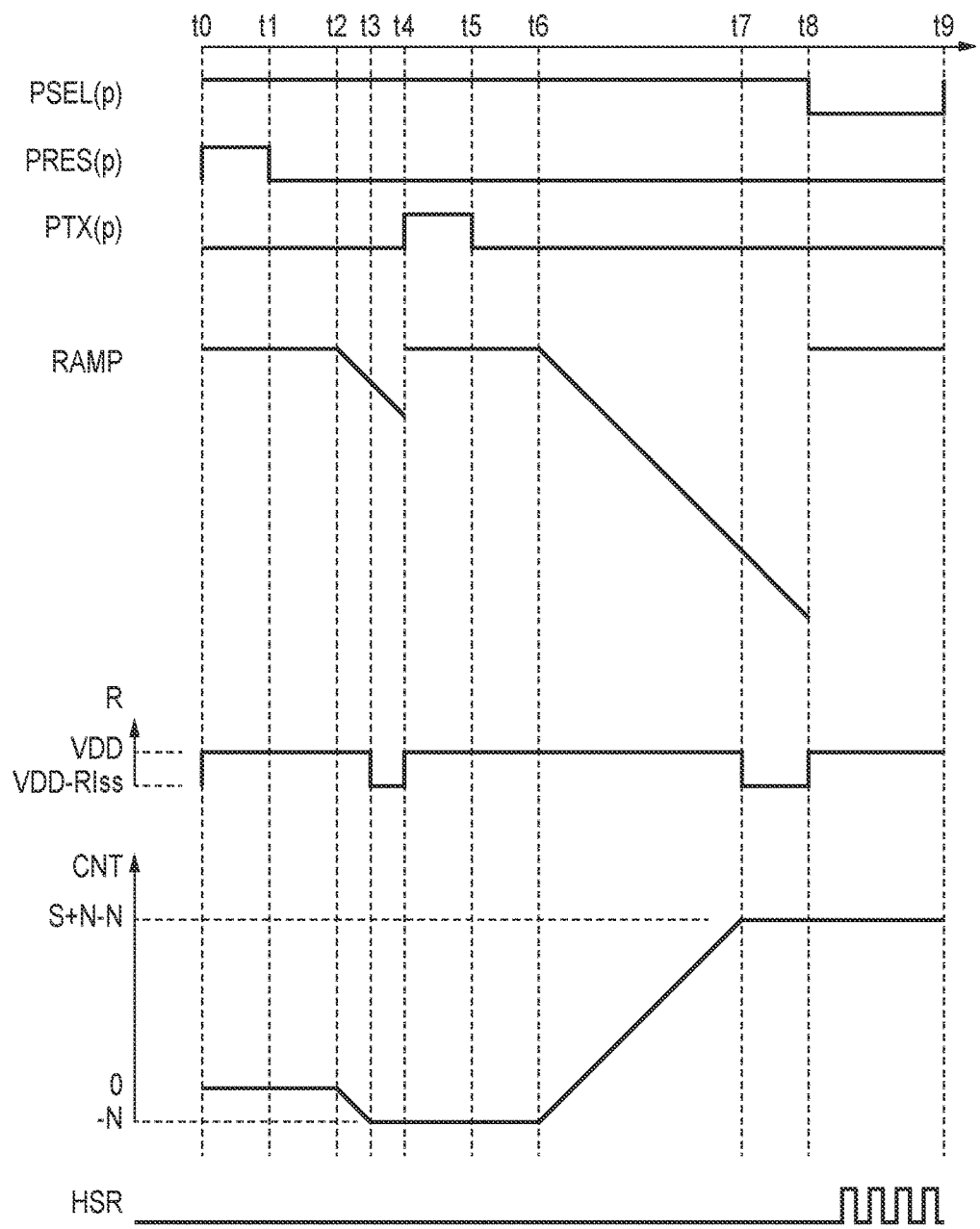
FIG. 3 is a timing chart illustrating a driving method of the image sensor according to embodiments.

FIG. 3 is an example of a timing chart pertaining to driving operations of the image sensor 1 in a first driving mode, for a given pixel row in the pixel section 20, and illustrates operations from when signals are read out from the pixels to when AD conversion is carried out and the digital image signal is output. In the first driving mode, one selection transistor per vertical signal line turns on.

t0 to t9 represent times, where pixel signal readout to AD conversion are carried out from time t0 to t8, and the digital image signal is horizontally scanned and output from time t8 to t9.

PSEL(p), PRES(p), and PTX(p) represent Hi periods and Lo periods of voltages applied to the gates of the selection transistor SEL, the reset transistor RES, and the transfer transistor TX in a pixel 1(p,q) in a pth row. Each transistor is on during the Hi period of the voltage applied to the gate, and is off during the Lo period. RAMP indicates the voltage of the ramp signal RAMP. R and CNT indicate the voltage at the output terminal of the comparator included in the AD conversion circuit ADq in the qth column and the value of the counter CNT, respectively. HSR represents a horizontal scanning signal generated by the horizontal scanning circuit. Each signal is generated by the system control unit 4 controlling the operations of the TG 8 in accordance with a driving pattern.

First, from time t0 to t1, the system control unit 4 sets PRES(p) to Hi. As a result, the system control unit 4 turns the reset transistor RES on and resets the voltage of the charge-voltage conversion unit to the power voltage VDD. The voltage of the charge-voltage conversion unit is actually reset to a voltage VDD−Vth(RES), which is lower than the power voltage VDD by a threshold voltage Vth(RES) of the reset transistor RES. The voltage after the reset corresponds to a reference level N.

At time t1, the system control unit 4 sets PRES(p) to Lo. As a result, the reset transistor RES turns off and the charge-voltage conversion unit enters a floating state. PSEL(p) is Hi from time t0, and thus a source follower circuit is formed by the power voltage VDD, the amplifier transistor SF, the selection transistor SEL, and the constant current source Iss. At this time, the gate voltage of the amplifier transistor SF is higher than the ramp signal RAMP, and thus the current Iss from the constant current source Iss flows only to the amplifier transistor SF and the selection transistor SEL. As such, the source voltage of the selection transistor SEL can be expressed through the following Formula 1.

$$\text{selection transistor SEL source voltage} = VDD - Vth(RES) - Vth(SF) - Vth(SEL) - \sqrt{2Iss/\beta} \quad (1)$$

Here,

Vth(SF) represents the threshold voltage of the amplifier transistor SF;

Vth(SEL) represents the threshold voltage of the selection transistor SEL; and

β represents a gain coefficient.

Note that as described above, the gain coefficient β is the same for the amplifier transistor SF and the selection transistor SEL.

At time t2, the system control unit 4 causes the ramp signal generation circuit 11 to start generating the ramp signal RAMP, in which the voltage drops at a constant rate every unit of time. The system control unit 4 also sets a count threshold of the AD conversion circuit to the reference level N, and causes the counter CNT to start the count operations (AD conversion operations at the reference level N).

When, at time t3, the voltage of the ramp signal RAMP is equal to the reference level N (the voltage VDD−Vth(RES) after the resetting of the charge-voltage conversion unit), half of the current, that is, Iss/2, also flows in the resistor R and the reference transistor REF. The count operations of the counter CNT also end. The count value at this time is a digital value, following the AD conversion at reference level N.

The count of the counter CNT may be counting up or counting down. When time t3 passes and the voltage of the ramp signal RAMP drops further, the current Iss flows in the resistor R and the reference transistor REF, and the voltage at both ends of the resistor R becomes RIss. Here, the voltage of the ramp signal RAMP when the output of the comparator inverts at time t3 can be found as follows. First, because the current flowing in the amplifier transistor SF and the selection transistor SEL is Iss/2, the source voltage of the selection transistor SEL can be found through the following Formula (2) on the basis of Formula (1).

$$\text{selection transistor SEL source voltage at time}$$
$$t3 = VDD - Vth(\text{RES}) - Vth(\text{SF}) - Vth(\text{SEL}) - \sqrt{Iss/\beta} \quad (2)$$

At time t3, the source voltage of the reference transistor REF is also equal to the source voltage of the selection transistor SEL. Additionally, because the current Iss/2 is flowing in the reference transistor REF, the gate voltage of the reference transistor REF is found through the following Formula (3).

$$\text{reference transistor REF gate voltage at time}$$
$$t3 = VDD - Vth(\text{RES}) - Vth(\text{SEL}) \quad (3)$$

Here, the threshold voltage Vth(SEL) of the reference transistor REF is assumed to be equal to the threshold voltage Vth(SF) of the amplifier transistor SF. To rephrase, Formula (3) expresses the output of the comparator in the AD conversion circuit inverting when the voltage applied to the gate of the amplifier transistor SF, excluding the amount of the threshold voltage Vth(SEL) of the selection transistor SEL, is equal to the RAMP voltage.

The system control unit 4 sets PTX(p) to Hi and turns the transfer transistor TX on from time t4 to t5. Accordingly, the voltage of the charge-voltage conversion unit drops to VDD−Vth(RES)−Vsig (signal level S). Vsig is a signal voltage of the pixel that is read out. The system control unit 4 also resets the voltage of the ramp signal RAMP.

At time t6, the system control unit 4 again causes the ramp signal RAMP to start being generated. The system control unit 4 also sets the threshold to the signal level S (VDD−Vth(RES)−Vsig) and causes the counter CNT to start counting operations.

When an AD conversion value of the reference level N is found by counting down, and the counting is carried out by counting up from time t6, a sum of the reference level N and the optical signal level S is counted up. Accordingly, the counter value when the counting ends at time t7 corresponds to the AD conversional value of Vsig. The voltage of the ramp signal RAMP at time t7 can be expressed through the following Formula (4), in the same manner as Formula (3).

$$\text{ramp signal voltage at time } t7 = VDD - Vth(\text{RES}) - Vsig - Vth(\text{SEL}) \quad (4)$$

The system control unit 4 causes the horizontal scanning signal to be generated in the period from time t8 to t9, sequentially reads out the values of the counters CNT within the AD conversion circuits ADq (digital pixel signals obtained by AD-converting the signal voltages of the pixels being read out), and transfers the values to the horizontal signal line HL. At this time, the system control unit 4 may return PSEL(p) to Lo in preparation for the next row selection.

The system control unit 4 increments p, drives the image sensor 1 in the same manner from time t0 to t9 for the next row to be read out, and reads out the digital pixel signals from the pixels in all of the rows. The foregoing has described the readout operations in the first driving mode.

Second Driving Mode

Next, driving operations of the image sensor 1 in a second driving mode, from when a signal is read out from a pixel to when AD conversion is carried out and a digital image signal is output, will be described using FIGS. 4 and 5. The second driving mode is a driving mode that AD-converts an average pixel signal obtained by simulatively averaging a plurality of pixel signals in the vertical direction, and outputs the AD conversion result, in order to reduce the number of readout pixels. In the second driving mode, a plurality (two, here) of selection transistors per vertical signal line turn on.

Figure 4:
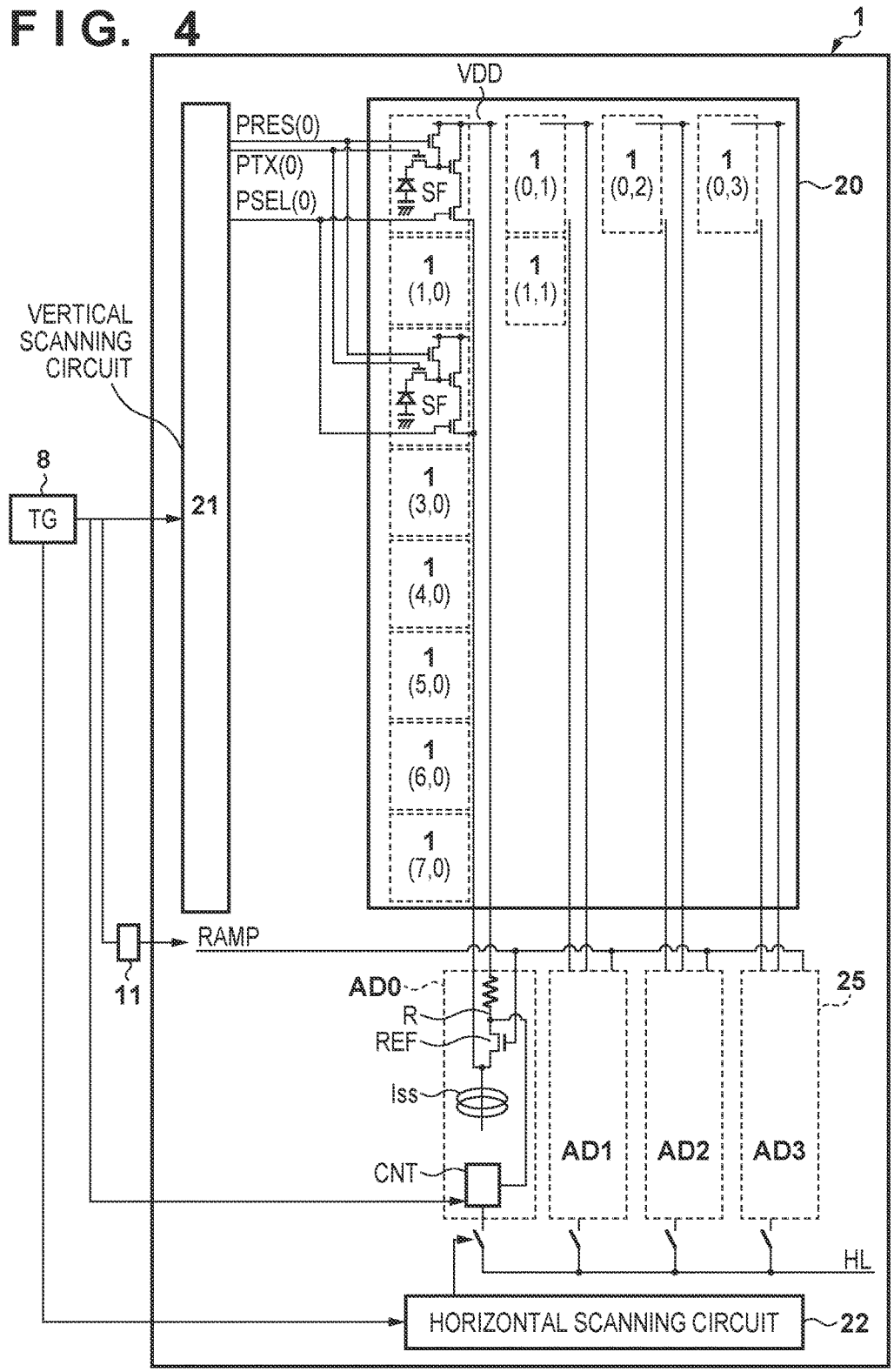
FIG. 4 is a block diagram illustrating the control configuration of the image sensor according to embodiments.

FIG. 4 is a diagram similar to FIG. 2, schematically illustrating the supply of control signals when the signals of two pixels, two rows apart in the vertical direction, are simulatively averaged and read out through the driving operations of the second driving mode. Here, a common control signal line from a vertical scanning circuit 21 is connected to the pixel 1(0,0) and a pixel 1(2,0), which are the subjects of the simulative averaging, but the configuration may be such that the same control signal is input to individual pixels through individual control signal lines.

Pixels at the same position in the horizontal direction but two pixels' apart in the vertical direction are subject to the simulative averaging because it is assumed, in the present embodiment, that the image sensor 1 has a Bayer array color filter and pixels provided with the same color in the color filter are to be subjected to the simulatively averaging. In an image sensor provided with a Bayer array color filter, a pixel 1(2,q) and a pixel 1(0,q) have the same color of color filter. By simulative averaging pixel signals of pixels provided with the same color of color filter in this manner (called "same-color pixels"), eight rows' worth of an image signal can be reduced to four rows' worth, accelerating the readout, suppressing the occurrence of spurious signals, and improving the S/N ratio. Thus although not illustrated in FIG. 4, the simulative averaging is carried out on sets of pixels such as a pixel 1(1,q) and a pixel 1(3,q), a pixel 1(4,q) and a pixel 1(6,q), and a pixel 1(5,q) and a pixel 1(7,q).

Here, in the second driving mode, the current Iss/2 flowing in the resistor R and the reference transistor REF when the output of the comparator in the AD conversion circuit inverts is divided between the two pixels, and thus the current for a single pixel drops to Iss/4. Accordingly, after the reset of the charge-voltage conversion units of the plurality of pixels that are subject to the averaging, the source voltages of the selection transistors SELS, which commonly connected to the pixel signals in parallel, become higher than in the first driving mode (Formula (1)), as expressed by the following Formula (5).

$$\text{selection transistor SEL source voltage} = VDD - Vth(\text{RES}) - Vth(\text{SF}) - Vth(\text{SEL}) - \sqrt{Iss/2\beta} \quad (5)$$

At this time, the source voltage of the reference transistor REF is equal to the source voltage of the selection transistor SEL (Formula (5)). However, the current flowing in the reference transistor REF is Iss/2, as in the first driving mode. Accordingly, the gate voltage of the reference transistor REF rises above the voltage of the ramp signal RAMP when the output of the comparator inverts in the first driving mode (Formula (3)), as expressed by the following Formula (6).

$$VDD-Vth(RES)-Vth(SEL)+(1-1/\sqrt{2})\sqrt{Iss/\beta} \qquad (6)$$

Accordingly, in the present embodiment, when reading out in the second driving mode, the starting voltage of the ramp signal RAMP is greater than in the first driving mode by the amount of this increase $((1-\sqrt{1/2})\sqrt{Iss/\beta})$. The amount of increase in the starting voltage may be changed in accordance with the number of pixels simulatively averaged.

The configuration and control operations of the ramp signal generation circuit 11 for increasing the starting voltage of the ramp signal RAMP in the second driving mode will be described next using FIGS. 5 and 6.

Figure 5:
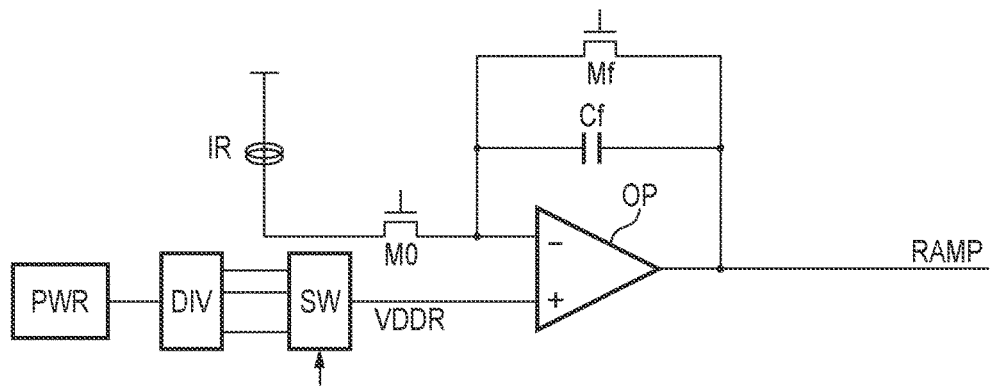
FIG. 5 is a block diagram illustrating the configuration of an image sensor according to a first embodiment.

FIG. 5 is a diagram illustrating an example of the configuration of the ramp signal generation circuit 11. A constant current source IR is connected to one input terminal of an op-amp OP via a transistor switch M0, and a power source VDDR is connected to the remaining input terminal of the op-amp OP. The ramp signal RAMP from an output terminal of the op-amp OP undergoes negative feedback through a capacitor Cf, and a transistor switch Mf is provided connecting both ends of the capacitor Cf.

The system control unit 4 can reset the voltage of the ramp signal RAMP to the voltage of the power source VDDR by turning the transistor switch Mf on and M0 off. The system control unit 4 turns the transistor switch Mf off and M0 on after the reset. Through this, charging current produced by the constant current source IR flows in the capacitor Cf, and the voltage of the ramp signal RAMP decreases as a direct function with respect to time t, expressed by the following Formula (7).

$$VDDR-(IR/Cf)t \qquad (7)$$

As described above, when reading out in the second driving mode, the ramp signal RAMP when the output of the comparator inverts in higher than in the first driving mode. As such, increasing the power source VDDR to compensate for the amount of the rise in the ramp signal RAMP in the second driving mode makes it possible to carry out AD conversion at the reference level N and the signal level S at a timing similar to that in the first driving mode. By extension, it is not necessary to carry out offset correction, gain correction, or the like in the second driving mode.

A configuration in which the power source VDDR input to the op-amp OP differs depending on the driving mode can be realized through a variety of methods. For example, in one configuration, a different power source VDDR is generated for each driving mode from the output voltage of a main power source PWR of the digital camera 100 using a voltage dividing circuit DIV, and the power source VDDR selected by the system control unit 4 switching a switch SW is input to the op-amp OP. In the second driving mode, if there are multiple choices for the number of pixels to simulatively average, the power source VDDR may be generated for each number of pixels using the voltage dividing circuit DIV. As indicated by Formula (6), the amount of increase in the ramp signal RAMP arising in the simulative averaging (additive readout) is known in advance, and thus a power source VDDR having the appropriate voltage value can be generated by the voltage dividing circuit DIV. The system control unit 4 varies the power source VDDR used when resetting the ramp signal generation circuit 11 in accordance with the driving mode of the image sensor 1 (or the number of pixels to be simulatively averaged (added)). The first driving mode can be thought of as a mode in which the number of pixels to be simulatively averaged is 1.

Figure 6:
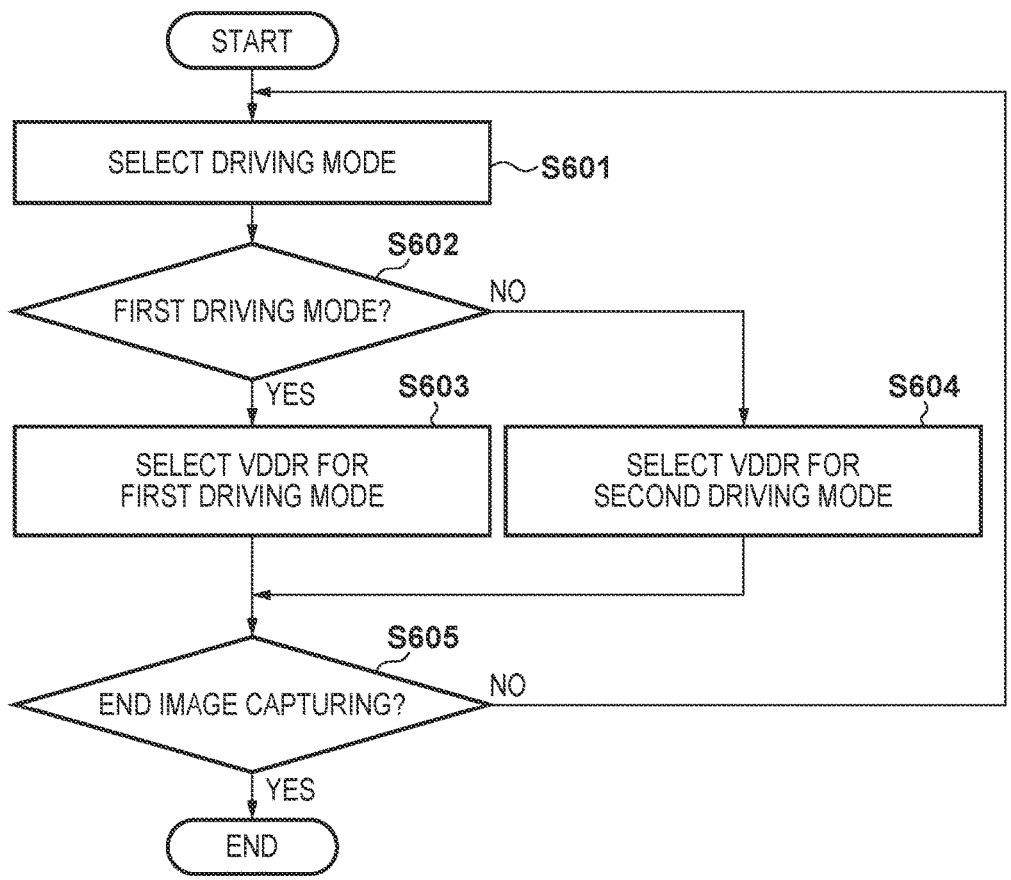
FIG. 6 is a flowchart illustrating control of an image capture apparatus according to the first embodiment.

FIG. 6 is a flowchart pertaining to the control of the ramp signal generation circuit 11 when capturing an image with the digital camera 100 according to the present embodiment.

In S601, the system control unit 4 selects the driving mode of the image sensor 1. Here, it is assumed that either the first driving mode, in which readout is carried out sequentially, one row at a time, in the vertical direction, or the second driving mode, in which readout is carried out while simulatively averaging (adding) 2 rows at a time in the vertical direction, is selected. Note that three or more driving modes, including a driving mode in which three or more rows are simulatively averaged, may be provided as well.

Note also that the system control unit 4 may select the driving mode in accordance with the purpose of the image capturing, an image capturing mode that is set, or the like. For example, the system control unit 4 can select the second driving mode when capturing an image for live view display, and can select the first driving mode when capturing an image for recording. Additionally, the system control unit 4 can select the first driving mode when capturing a still image, and the second driving mode when capturing a moving image. Additionally, the system control unit 4 can select the first driving mode when the number of pixels to be recorded as a first number, and can select the second driving mode when the number of pixels to be recorded is a second number lower than the first number. Additionally, the system control unit 4 can select the second driving mode under capturing conditions or in a capturing mode in which it is necessary to reduce noise, and can select the first driving mode in other capturing conditions or capturing modes. These are merely examples, and the system control unit 4 can, for example, select the driving mode while referring to information, stored in the ROM 5, expressing relationships between predetermined conditions and driving modes. Driving mode information may be included in the above-described driving patterns for controlling operations of the timing generation circuit 8.

In S602, the system control unit 4 determines whether or not the selected driving mode is the first driving mode. If the driving mode is the first driving mode, the processing advances to S604, whereas if the driving mode is not the first driving mode (that is, if the driving mode is the second driving mode), the processing advances to S603.

In S603, the system control unit 4 selects the power source VDDR for the second driving mode. Specifically, the system control unit 4 switches the switch SW illustrated in FIG. 5 such that the power source VDDR for the second driving mode is selected and output. The power source VDDR for the second driving mode has a voltage higher than the power source VDDR for the first driving mode by $(1-\sqrt{1/2})\sqrt{Iss/\beta}$.

In S604, the system control unit 4 selects the power source VDDR for the first driving mode.

Thereafter, the system control unit 4 executes image capturing operations (as well as recording operations, display operations, and so on as necessary). The image capturing operations (exposure control, focus adjustment, exposure, image signal readout, and generation of image data for different purposes), the recording operations, and/or the display operations may be the same operations as those executed by typical digital camera, and thus detailed descriptions thereof will be omitted.

In S604, the system control unit 4 determines whether or not an instruction to end operations in the capturing mode, such as an instruction to change to a playback mode or a power-off instruction, has been detected. If it is determined that such an instruction has been detected, the processing ends, whereas if it is determined that such an instruction has not been detected, the processing returns to S601.

For example, if an instruction to capture a still image has been made while capturing a live view image (moving image) in the second driving mode, the system control unit 4 switches to the first driving mode and captures a still image. Then, when the process of capturing a still image ends and the camera returns to a standby state, the system control unit 4 once again switches to the second driving mode and resumes capturing the live view image.

It is assumed that as the number of pixels subject to simulative averaging increases, the starting voltage of the ramp signal RAMP (the increasing level of the power source VDDR) will be higher. The increasing level depends on the magnitude of the current Iss supplied by the constant current source, and thus the increasing level may be controlled by reducing the current Iss. Additionally, an increasing level of the power source VDDR may be prepared in accordance with the maximum value of the number of pixels subjected to the simulative averaging, and the current Iss supplied by the constant current source may be increased if the number of pixels subjected to the simulative averaging is less than the maximum value.

Additionally, it can be assumed that as a voltage range of the pixel signal increases, the current flowing in the amplifier transistor SF, the driving performance of which has been increased equivalently by the simulative averaging, will not be Iss/2 when the output of the comparator inverts. In such a case, changing the value of the current supplied by the constant current source IR of the ramp signal generation circuit 11 in addition to the initial voltage of the ramp signal RAMP during the simulative averaging readout to reduce the slope (change rate) of the ramp signal is also effective.

Note that the reference transistor REF can be disposed outside the pixel section 20, and thus there are cases where the size is increased in order to ensure performance. The gain coefficient β of a transistor depends on the ratio between the gate width and the gate length, and thus in the case where the size of the reference transistor REF has been increased, the gain coefficient β of the reference transistor REF may not be the same as the gain coefficient β of the amplifier transistor SF disposed within the same pixel section. In this case, assuming the gain coefficient of the reference transistor REF is α, the voltage of the ramp signal RAMP becomes the same as the voltage of the pixel signal inputted to the gate of the amplifier transistor SF minus the threshold voltages of the transistors when the constant current Iss is divided by the ratio β:α. Thus the threshold of the comparator in the AD conversion circuit is set as follows in the first driving mode:

$$VDD-\alpha RIss/(\alpha+\beta) \qquad (8)$$

In the present embodiment, when using a transistor constituted by a vertical signal line connecting the pixels in a current mirror circuit to AD-convert a pixel signal by comparing the voltage of the vertical signal line with a reference voltage having a constant rate of change, the starting voltage of the reference voltage is changed in accordance with the number of pixels subjected to the simulative averaging. Accordingly, the AD conversion can be carried at the same timing when simulatively averaging the signals of a plurality of pixels and when not carrying out such simulative averaging. Additionally, it is not necessary to additionally carry out offset correction, gain correction, or the like when simulatively averaging.

Second Embodiment

A second embodiment of the present invention will be described next. As described in the first embodiment, the voltage of the ramp signal RAMP that inverts the output of the comparator is higher when simulative averaging is carried out than when simulative averaging is not carried out. This is because when simulatively averaging two pixels, the equivalent gate width of the amplifier transistor SF and the selection transistor SEL connected to the vertical signal line becomes double, which improves the driving ability.

According to the first embodiment, increasing the initial voltage of the ramp signal RAMP (when the ramp signal decreases constantly) when carrying out simulative averaging makes it possible to operate at the same timing as when the simulative averaging is not carried out. As opposed to this, in the present embodiment, the same effects as those of the first embodiment are realized by increasing the driving ability of the reference transistor REF when simulative averaging is carried out.

Figure 7:
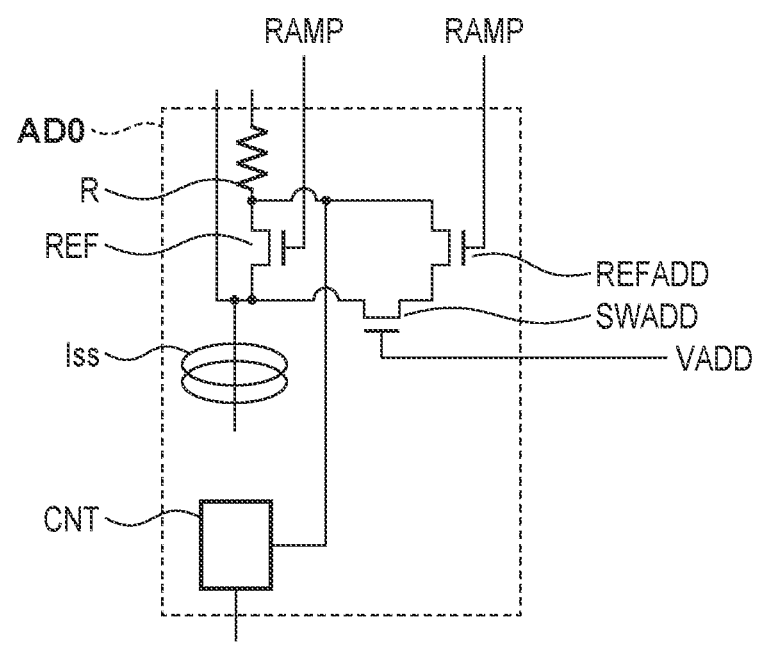
FIG. 7 is a block diagram illustrating the configuration of an image sensor according to a second embodiment.

FIG. 7 is a diagram illustrating an example of the configuration of the AD conversion circuit ADO in the image sensor 1 according to the present embodiment. The configuration differs from that described in the first embodiment (FIG. 2) in that a second reference transistor REFADD and a transistor switch SWADD have been added. The transistor switch SWADD can be controlled to turn on and off by a control signal VADD. If the transistor switch SWADD is on, the second reference transistor REFADD is electrically connected to the reference transistor REF in parallel. The second reference transistor REFADD has the same threshold voltage, gain coefficient β, and so on as the reference transistor REF. Note that when simulatively averaging two or more pixels, a set of a reference transistor and a transistor switch can be added for each number of pixels to be simulatively averaged.

Additionally, FIG. 7 illustrates a configuration in which the number of transistors having the same threshold voltage and gain coefficient β as the reference transistor REF is increased and the driving ability on the reference transistor side (the side of the comparator of the current mirror circuit) is increased by adding the transistor switch SWADD. However, the configuration may be such that, for example, a reference transistor having a higher driving ability than the reference transistor REF, by having a broader gate width or the like, is provided, and a single reference transistor having a driving ability based on the number of pixels to be simulatively averaged is selected and used. For example, the configuration may be such that the gate width of the second reference transistor REFADD is double that of the reference transistor REF, and switching is carried out in the second driving mode such that the second reference transistor REFADD is used and the reference transistor REF is not used (is deactivated).

Figure 8:
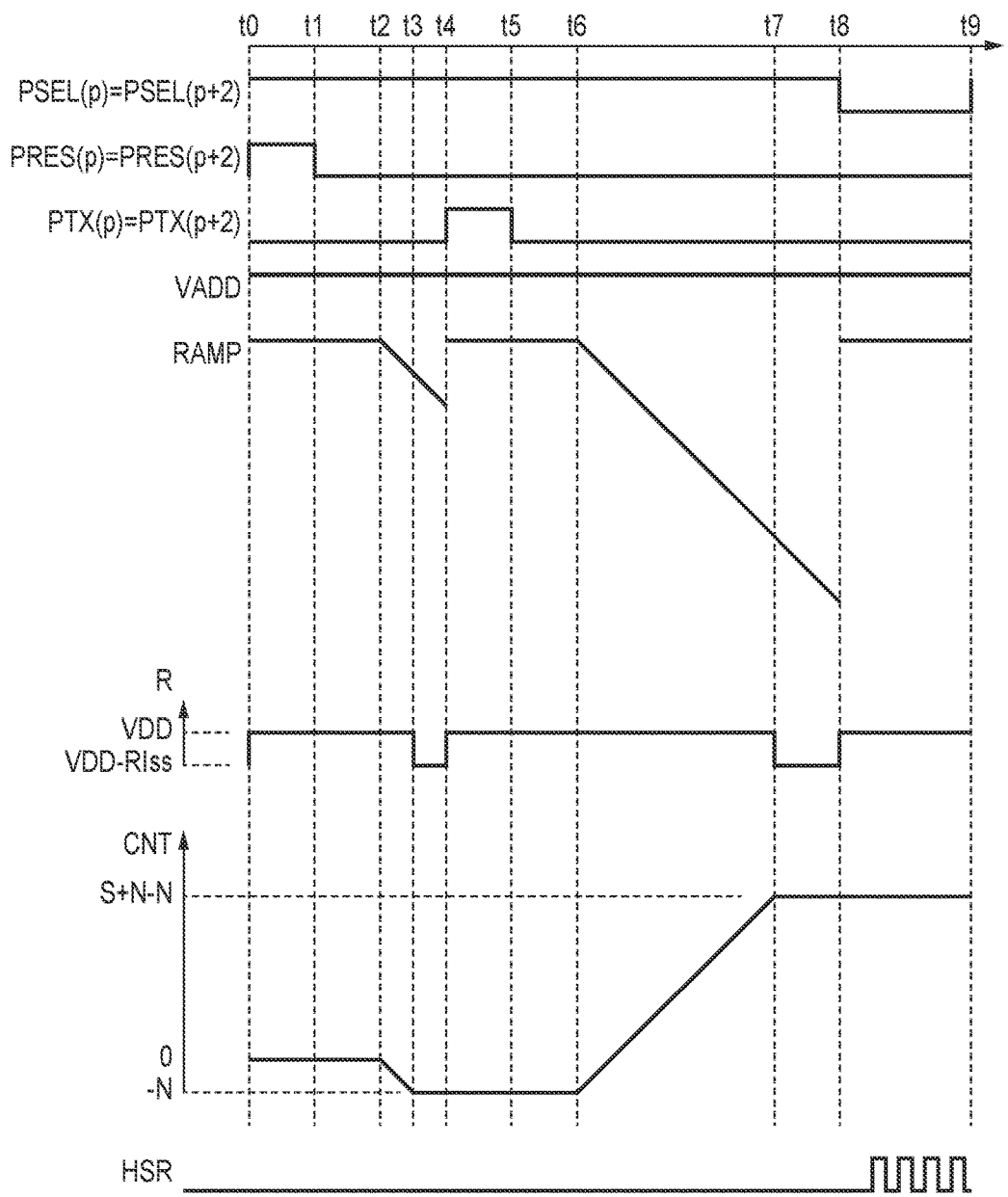
FIG. 8 is a timing chart illustrating a driving method of the image sensor according to the second embodiment.

FIG. 8 is an example of a timing chart for a case where the image sensor 1 is driven in the second driving mode according to the present embodiment. The timing chart according to the first embodiment, illustrated in FIG. 3, is the same for the first and second driving modes; however, FIG. 8 illustrates a timing chart for the second driving mode only.

Accordingly, FIG. 8 differs from FIG. 3 (the first driving mode) in that the simultaneous control of PSEL, PRES, and PTX in the pth row and the p+2th row is made clear, and that the control signal VADD is fixed at Hi in order to keep the switch transistor SWADD on. If the control signal VADD is not set to Hi in the second driving mode, of the two paths in the current mirror circuit, the path on the side of the amplifier transistor SF and the selection transistor SEL will have a higher driving ability. Accordingly, for the reference level N, the output of the comparator inverts earlier than time t3, and for the signal level S, the output of the comparator inverts earlier than time t7.

It is therefore necessary to prepare, for the second driving mode, an offset correction value, for each column, that corrects a remainder of correlated double sampling carried out by counting down when AD-converting the reference level N and counting up when AD-converting the signal level S. It is also necessary to prepare, for the second driving mode, a gain correction value for the slight nonlinearity of the ramp signal RAMP.

However, fixing the control signal VADD to Hi (keeping the switch transistor SWADD on and activating the second reference transistor REFADD) makes it possible to balance the driving abilities in the two paths of the current mirror circuit. As such, the output of the comparator can be inverted at time t3 and time t7, in the same manner as in the first driving mode, and thus it is not necessary to prepare correction values for the second driving mode.

Aside from the control signal VADD, the configuration is basically the same as the first embodiment, and redundant descriptions will therefore be omitted.

Figure 9:
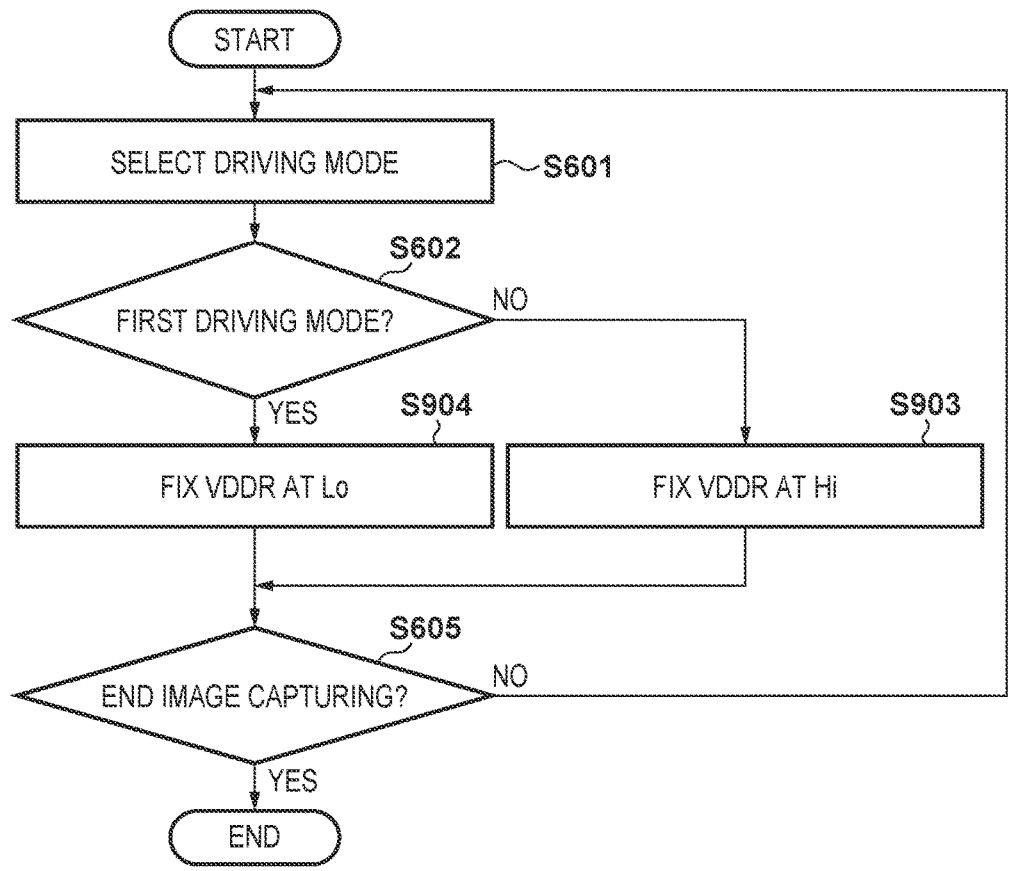
FIG. 9 is a flowchart illustrating control of an image capture apparatus according to the second embodiment.

FIG. 9 is a flowchart pertaining to the control of the ramp signal generation circuit 11 when capturing an image with the digital camera 100 according to the present embodiment. Processes that are the same as those in the first embodiment have been given the same reference numerals as those in FIG. 6, and redundant descriptions thereof will be omitted.

In S602, the system control unit 4 determines whether or not the selected driving mode is the first driving mode. If the driving mode is the first driving mode, the processing advances to S904, whereas if the driving mode is not the first driving mode (that is, if the driving mode is the second driving mode), the processing advances to S903.

In S903, the system control unit 4 fixes the control signal VADD at Hi. Through this, the second reference transistor REFADD is activated, and the driving ability of the transistor forming the comparator in the AD conversion circuit is improved (balanced with the driving ability of the vertical signal line-side transistor).

In S904, the system control unit 4 fixes the control signal VADD at Lo. Accordingly, the second reference transistor REFADD is deactivated, and driving operations are carried out according to the first driving mode, in which only the reference transistor REF is used.

According to the present embodiment, the same effects as those of the first embodiment can be achieved by improving the driving ability of the transistor on the side of the comparator of the current mirror circuit so as to achieve balance with the driving ability of the vertical signal line-side transistor, instead of adjusting the initial voltage of the ramp signal RAMP. Note that the "side of the comparator of the current mirror circuit" has the same meaning as the "side of the reference transistor of the AD conversion circuit".

Other Embodiments

Although exemplary embodiments of the present invention have been described thus far, the present invention is not limited to these embodiments. Many variations and modifications can be made without departing from the essential spirit of the invention. For example, a layered configuration in which a board on which the AD conversion circuit is formed is electrically connected to a board on which the pixel section 20 is formed may be implemented using Through Silicon Vias (TSVs) or the like.

Additionally, although an embodiment in which the present invention is applied in a configuration having an AD conversion circuit provided for each column that shares a vertical signal line has been described, the present invention is not limited thereto. The present invention can also be applied in a configuration in which an AD conversion circuit is provided for each of two-dimensional pixel sections having a plurality of rows and columns, for example. Specifically, in this case, the same effects can be achieved by a configuration in which the output of the amplifier transistor SF is common within the pixel section and a mirror transistor corresponding to the common amplifier transistor SF is provided.

Although the timing generation circuit (TG) and the ramp signal generation circuit (RAMP) are provided separate from the image sensor in the above-described embodiments, those circuits may be elements included in the image sensor.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-56462, filed on Mar. 22, 2017, which is hereby incorporated by reference herein in its entirety.

What is claimed is:
1. An image sensor comprising:
   a plurality of pixel sections in which pixels are arranged two-dimensionally, each of the pixels connecting to a common amplifier transistor, the common amplifier transistor being connected to a power voltage and having a gate into which voltages of signal charges, generated by photoelectric conversion areas included in the pixels, are respectively input; and AD conversion circuits that are provided for the plurality of pixel sections respectively, wherein each of the AD conversion circuits includes:
  a reference transistor that has a gate into which a ramp signal having a voltage that changes at a constant rate is input; and
  a constant current source that is connected to the reference transistor and the common amplifier transistor, and
  wherein the common amplifier transistor and the reference transistor form a current mirror circuit.

2. The image sensor according to claim 1, further comprising a controller that controls the voltage of the ramp signal or a driving ability of the reference transistor.

3. The image sensor according to claim 1, wherein each of the AD conversion circuits corresponds to an area in which pixels are arranged in a plural and a plurality of columns.

4. The image sensor according to claim 1, wherein the AD conversion circuits are formed on a board different from board on which the plurality of pixel sections are formed, and are electrically connected to the plurality of pixel sections by using Through Silicon Vias (TSVs), respectively.

5. The image sensor according to claim 1, wherein a gain coefficient of the common amplifier transistor is different from a gain coefficient of the reference transistor.

6. The image sensor according to claim 1, wherein the common amplifier transistor is disposed outside of the corresponding pixels, and a size of the common amplifier transistor is different from a size of the reference transistor.

7. The image sensor according to claim 1, wherein each of the plurality of pixel sections includes same-color pixels.

8. An imaging apparatus comprising:
  an image sensor; and
  an optical imaging system,
  wherein the image sensor comprises:
  a plurality of pixel sections in which pixels are arranged two-dimensionally, each of the pixels connecting to a common amplifier transistor, the common amplifier transistor being connected to a power voltage and having a gate into which voltages of signal charges, generated by photoelectric conversion areas included in the pixels, are respectively input; and
  AD conversion circuits that axe provided for the plurality of pixel sections respectively, wherein each of the AD conversion circuits includes:
  a reference transistor that has a gate into which a ramp signal having a voltage that changes at a constant rate is input; and
  a constant current source that is connected to the reference transistor and the common amplifier transistor,
  wherein the common amplifier transistor and the reference transistor form a current mirror circuit.

9. The imaging apparatus according to claim 8, further comprising one or processors that execute a program stored in a memory,
  wherein the one or more processors selects a mode of the image sensor.

10. The imaging apparatus according to claim 9, wherein the one or more processors selects the mode from among a plurality of modes including at least a first ode and a second mode with a smaller number of pixels than the first mode.

11. The imaging apparatus according to claim 9, wherein the one or more processors the mode from among a plurality of modes including at least a first mode for capturing a still image and a second mode for capturing a moving image.

12. The imaging apparatus according to claim 9, wherein the one or more processors the mode from among a plurality of modes including at least a first mode for capturing a still image and a second mode for capturing a live view image.

13. An imaging apparatus comprising:
  an image sensor;
  an image memory that stores digital signals transfer from the image sensor; and
  a processor that applies noise reduction process to the digital signal stored in the image memory,
  wherein the image sensor comprises:
  a plurality of pixel sections in which pixels are arranged two-dimensionally, each of the pixels connecting to a common amplifier transistor, the common amplifier transistor being connected to a power voltage and having a gate into which voltages of signal charges, generated by photoelectric conversion areas included in the pixels, are respectively input; and
  AD conversion circuits that are provided for the plurality pixel sections respectively, wherein each of the AD conversion circuits includes:
  a reference transistor that has a gate is to which a ramp signal having voltage that changes at a constant rate is input; and
  a constant current source that is connected to the reference transistor and the common amplifier transistor,
  wherein the common amplifier and the reference transistor form a current mirror circuit, and
  wherein the image memory stores the digital signals transferred from the AD conversion circuits.

14. The imaging apparatus according to claim 13, further comprising a display device having a touch panel,
  wherein the processor obtains information pertaining to a subject region.

* * * * *